United States Patent [19]
Yochum

[11] 3,980,217
[45] Sept. 14, 1976

[54] VEHICLE TOOL RACK

[76] Inventor: Merritt K. Yochum, 4847 E. Nye Lane, Carson City, Nev. 89701

[22] Filed: Feb. 24, 1975

[21] Appl. No.: 552,768

[52] U.S. Cl. .............................. 224/42.04; 211/60 T
[51] Int. Cl.[2] ...................... B60R 9/06; B60R 11/06
[58] Field of Search ............ 312/280, 281; 248/201; 224/42.03 R, 42.45 R, 42.04; 211/60 T

[56] References Cited
UNITED STATES PATENTS

| | | | |
|---|---|---|---|
| 1,983,187 | 12/1934 | Oswell | 224/42.03 R |
| 2,580,625 | 1/1952 | Waltz | 248/201 |
| 3,161,973 | 12/1964 | Hastings | 248/201 |
| 3,291,427 | 12/1966 | Hutchings | 224/42.45 R |
| 3,432,133 | 3/1969 | Schmid | 224/42.45 |
| 3,443,730 | 5/1969 | Meusel | 224/42.03 R |
| 3,831,892 | 8/1974 | Herman | 224/42.45 R |
| 3,848,786 | 11/1974 | Baxter | 224/42.45 R |

Primary Examiner—Casmir A. Nunberg
Assistant Examiner—Alex Grosz

[57] ABSTRACT

The specification hereof sets forth a vehicle tool rack and locking means for the tools comprising two supporting arms or rack elements bolted to a bumper of a vehicle. The two supporting arms, or rack elements, respectively create a bumper guard effect and are provided with openings and brackets for receiving a jack, shovel, and ax. The jack, shovel, and ax are received within the brackets and openings, and are secured and locked thereto by means of a chain or other locking means which circumscribe a portion of the tools.

6 Claims, 6 Drawing Figures

VEHICLE TOOL RACK

BACKGROUND OF THE INVENTION

1. Field of the Invention

The field of this invention lies within the tool rack art. In particular, it lies in the art of vehicle tool racks that are utilized with bumper fixtures, or bumper guards to support emergency vehicle and off-road vehicle tools.

2. The Prior Art

The prior art related to this invention incorporates the storage and utilization of winches, jacks, and other devices that have been mounted on bumpers. The foregoing enable a vehicle to be drawn or hauled from certain locations when the vehicle is stuck.

It has also been common to place certain tools on racks and within vehicles in order to provide the vehicle with emergency brush clearing and vehicle removal equipment. In particular, it has been known to implace a shovel or some other digging means in an emergency or off-road vehicle to allow it to be dug out of a trench, rut, or off-road condition which caused the vehicle to stick in the surrounding terrain.

It has also been known in the prior art to incorporate a jack with a vehicle in order to allow a vehicle to be lifted with respect to certain terrain, to facilitate the removal of the vehicle, or lifting of it over certain obstacles or objects.

The prior utilization of such removal tools with vehicles has not allowed for an easy and ready transport of the tools. In particular, the tools have been placed in an awkward manner on the bumpers, or have been placed in the vehicle itself, thus creating certain storage problems, as well as inaccessibility.

This invention provides a tool rack that can be a combination bumper guard and bumper rack for holding the tools in a readily exposed position. The exposure of the tools in such a position allows them to be readily utilized in a facile manner. Furthermore, the tools are always held in a position that does not interfere with the general storage or interior facilities of the vehicle.

In addition to the foregoing, the tool rack allows a bumper guard action as well as a locking facility for holding the tools in tightened, locked, juxtaposition within the rack. This accommodates all the required tools for proper utilization and ease of use in a readily accessible position while at the same time allowing the locking thereof to the bumper of a vehicle without disturbing the interior orientation of the vehicle.

Thus, this invention provides many advantages over the prior art which shall be shown in detail in the following specification.

SUMMARY OF THE INVENTION

In summation, this invention comprises a tool rack and combination bumper guard that is attached to a bumper and provides a lock for maintaining the tools in a locked position thereon.

In particular, this invention incorporates the utilization of two arms, or extensions, which serve as a bumper guard and combination tool rack and lock. The extensions or bumper guards utilize a series of cutouts or openings which receive a number of tools that are utilized generally with off-road vehicles. The bumper guards are bolted by means of locking nuts to the bumper and allow a jack, shovel, and ax to be stored thereon in the particular embodiment described hereinafter.

The tools are locked to the rack by means of a chain or other means which can be wrapped around the tools are locked to the bumper guard in a manner whereby the tools are held in their openings. Thus, the invention provides a new and novel combination of a tool rack, bumper guard, and lock that receives certain tools for off-road or other vehicle usage.

BRIEF DESCRIPTION OF THE DRAWINGS

The invention will be more clearly understood by reference to the description below taken in conjunction with the accompanying drawings wherein.

DESCRIPTION OF THE PREFERRED EMBODIMENTS

Figure 1:
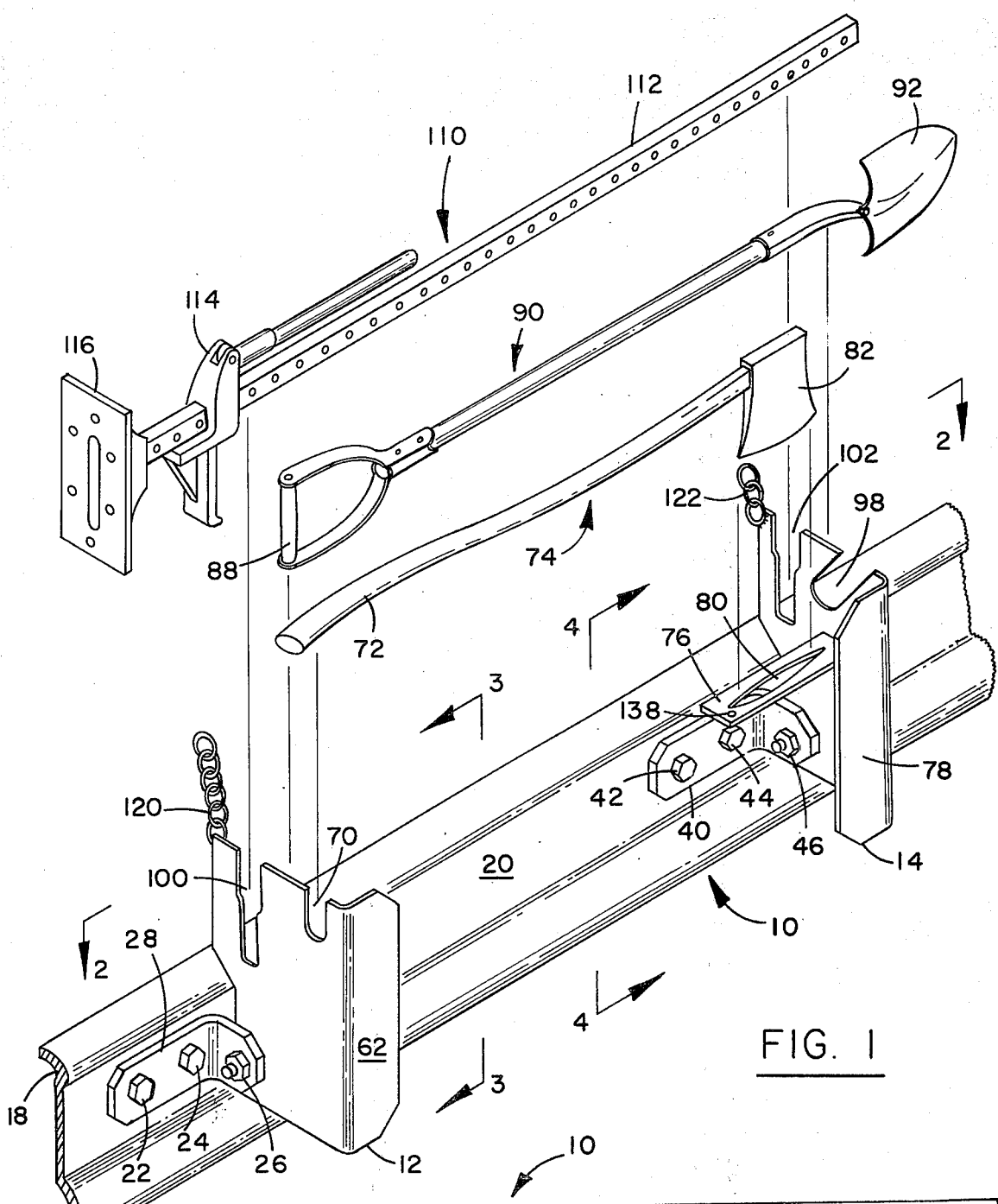
FIG. 1 shows a fragmented view of a bumper with the invention mounted thereon having the tools to be mounted in the invention in overlying projected relationship thereto, all of which are in perspective view.
Figure 2:
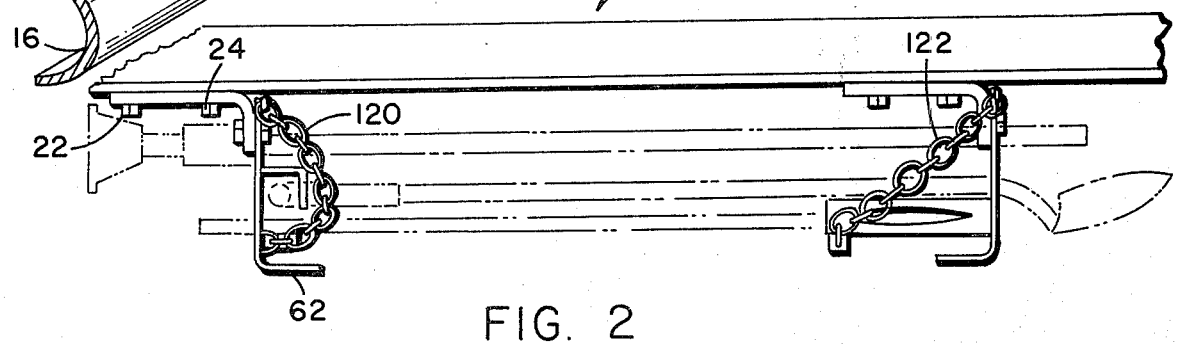
FIG. 2 shows a top plan view of the invention in the direction of lines 2—2 of FIG. 1.
Figures 5, 6:
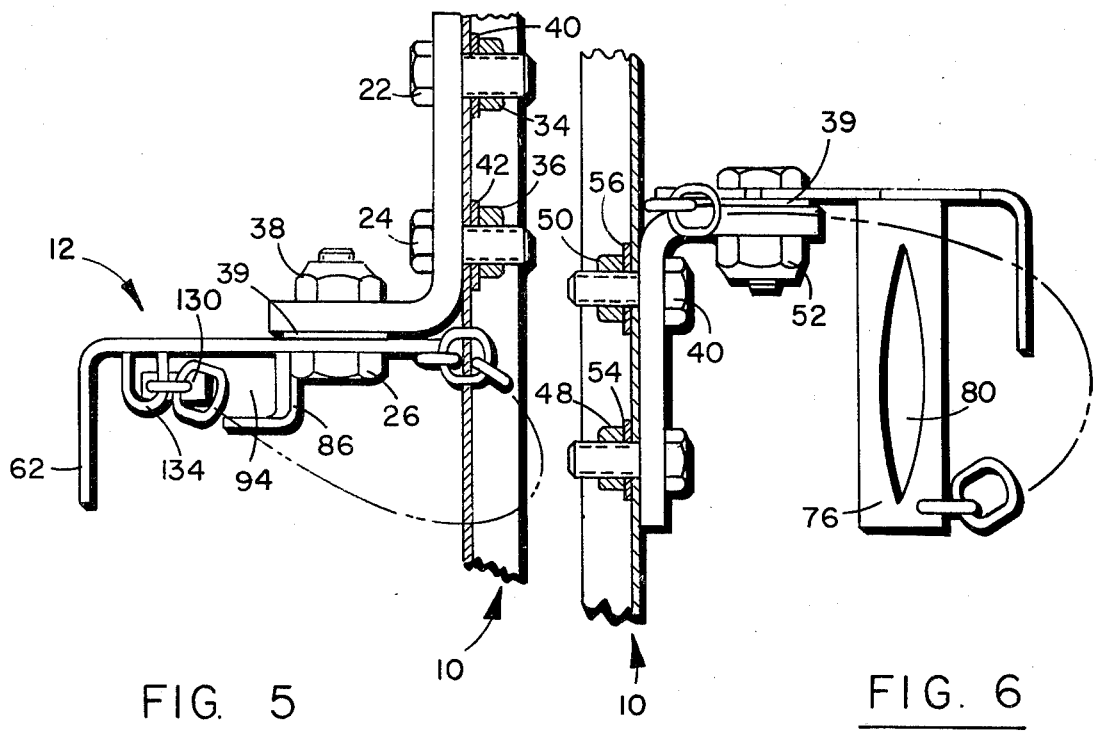
FIG. 5 shows a top plan view of the first rack element of the invention in the direction of lines 5—5 of FIG. 3; and, FIG. 6 shows a plan view of the second rack element of the invention in the direction of lines 6—6 of FIG. 4.
Figures 3, 4:
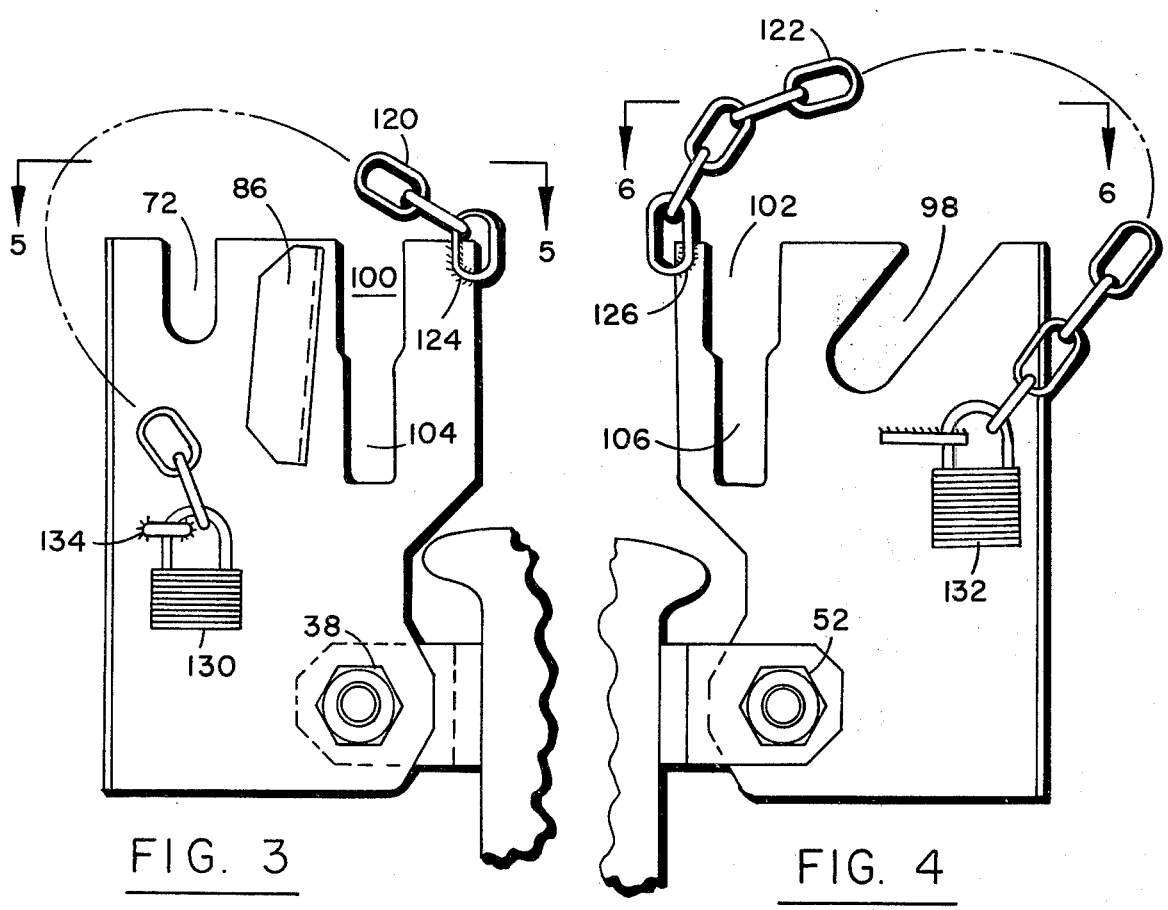
FIG. 3 shows an upright elevation view of one of the rack elements of the invention in the direction of lines 3—3 of FIG. 1.
FIG. 4 shows an upright elevation view of the other rack element of the invention in the direction of lines 4—4 of FIG. 1.

A showing is made of a bumper 10 having a pair of rack elements, extensions, arms, or bumper guards 12 and 14 bolted thereto. The bumper 10 has been shown in fragmented form and need not be of any particular configuration other than being compatible in the form of a bumper to which the rack elements 12 and 14 can be attached.

The bumper 10 in this particular embodiment has been shown as a singular steel member having a curved lower portion 16 and an upper portion 18 meeting in a flat cross web 20. The cross web 20 receives bolts 22, 24 and 26 for purposes of supporting the left hand rack (when viewing the showing) or bumper guard 12 which has an L bracket 28.

The L bracket 28 can be made of any suitable material and receives the bolts 22 and 24 through holes that have been bored therein. The bolts 22 and 24 are secured by means of a pair of nuts 34 and 36 that are known as lock nuts. The nuts 34 and 36 are axially slit along a portion of the periphery thereof for purposes of allowing the nuts 34 and 36 to expand over the bolts 22 and 24. The nuts 34 and 36 have a smaller diameter, before expandedly threading over the bolts. Thus, once they are secured on the bolts 22 and 24, they are quite difficult to unthread.

The bolt 26 to which the rack 12 is attached, also receives a nut 38 which is slit and secured to the bolt 26 in the same manner as the nuts 34 and 36. The bolts 22 and 24 are respectively backed by washers 40 and 42 so that nuts 34 and 36 serve to override the washer, thereby providing a surface against which they can turn.

The foregoing configuration of nuts 34, 36 and 38 are such that they prevent the withdrawal of the bolts 22, 24 and 26 by virtue of the clamping action of the nuts providing a frictional engagement on the bolts. This is due to the fact that the inside diameter of the nuts prior to the time they are turned onto the bolts is less than the outside diameter of the bolts. This causes a frictional engagement which is quite difficult to release until a substantial torque has been applied to the nut.

It should be understood that the bolts 22, 24 and 26 can be substituted by rivets, welds, or any other suitable securement means. However, it has been found that the accommodating relationship and ease of application in most cases dictates use of the expandable nut concept as previously described in the preferred embodiment.

The second or right hand rack 14 (looking at the drawing), or bumper guard, is secured to the web or midsection 20 of the bumper 10 by means of an L bracket 40 having bolts 42, 44 and 46 respectively secured to nuts 48, 50 and 52. The nuts 48 and 50 have washers 54 and 56 for allowing the nuts 48 and 50 to turn thereon.

The L bracket 40 is secured in like manner as the bracket 28. In particular, it utilizes the locking nuts that have the frictionally engaging characteristics previously described for securing the bracket 28. The bracket 40 of course can be secured in any other manner, and with a star washer 39 interfacing the contact points.

However, in this specific embodiment it has been found that securement by means of the nut and the bolt arrangement provides a ready and facile arrangement for locking the rack to the bumper.

The rack 12 incorporates an angle member or overturned portion 62 which provides a bumper guard to the bumper 10 in an L type cross sectional configuration. The bumper guard configuration allows the bumper 10 to absorb loads impinged thereon by impact, as well as receiving tools in a manner to be described.

In particular, the rack 12 incorporates a U shaped slot 70 which receives the rounded ax handle portion 72 of an ax 74. The U shaped slot 70 cooperates with a bracket 76 that is welded to the other rack element 14.

Rack 14 also has a similar bumper guard turned over portion 62 as rack 12. The bracket 76 has an oblong opening 80 with the capability of receiving an ax blade portion 82 of the ax 74. Thus, the ax handle rounded portion 72 fits in the U shaped opening 70 and is received at its blade end 82 by means of the opening 80 of the bracket 76. This supports the ax in a manner whereby the blade is not damaged and the ax is in a locked position by virtue of the arrangement of the tools in a manner to be described.

An L shaped or cupping bracket 86 is attached to the rack 12 for receipt of a handle 88 of a shovel 90 having a blade portion 92 thereof. The shovel 90 and handle 88 is supported within the interior 94 of the bracket 86. The other end of the shovel 90 rests upon the bracket or rack element 14 with the handle of the shovel 90 placed within an angular slot 98. The angular slot 98 allows the shovel handle to rest in a supported manner in an angular position so that it slides downwardly and inwardly. Thus, it does not tend to ride out of the slot 98 while the handle 88 is held in juxtaposition within the opening 94 of the bracket 86.

A first slot 100 and a second slot 102 are provided within the rack 12 and 14 respectively. The slots 100 and 102 have a similar configuration and taper into a smaller width at the base into two smaller width openings 104 and 106. Each of the smaller width openings receive a rectangular portion of a jack 110. The rectangular portion of the jack 110 is the shaft portion 112 of the jack which supports the jack handle and jack ratchet portion 114 and a base 116 upon which the jack rests when it is being utilized for lifting purposes.

In order to lock and secure the three foregoing tools, a first chain 120 and a second chain 122 are each respectively welded at their ends at points 124 and 126, into their respective slot supports. The chains 120 and 122 are provided with locks 130 and 132. The lock 130 is secured to a U shaped loop 134 which has been welded to the interior of the rack 12. A hole 138 is provided within the bracket 76 to receive the second lock 132. The hole 138 allows the lock 132 to hold the chain 120 in tightened juxtaposition to the rack 14 and in overlying relationship around the tools.

The foregoing provides a fast and easy method of securing the respective tools comprising the ax 74, shovel 90 and jack 110 to the bumper and at the same time locks them with the chains 120 and 122. Thus, the tools are accessible and in a position, as to their storage, so that they do not hinder the interior or storage facilities of the vehicle.

I claim:
1. A bumper guard for holding hand tools on the bumper of a vehicle comprising:
   a first bumper guard having openings therein adapted to receive one end of the hand tools whereby the hand tools are laid within the openings internal to the outer portion of said bumper guard surface so that any intervehicular contact will be between the bumper guard and the other vehicle without contacting the hand tools and having bolt fastening means for securing said guard to a bumper;
   a second bumper guard for receiving the other end of the hand tools received within said first bumper guard and having bolt fastening means for securing said guard internal to the outer portion of said bumper guard surface so that any inter-vehicular contact will be between the bumper guard and the other vehicle without contacting the hand tools to a bumper; and,
   a flexible connector secured to at least one rack element; and an opening on said rack element to receive a lock through the opening and said flexible connector for securing the tools in at least partially wrapped relationship by said connector to avoid removal of the tools from said rack.
2. The bumper guard as claimed in claim 1 wherein:
   each bumper guard comprises two plates angularly turned over at the forward ends thereof to provide a bumper.
3. The bumper guard as claim in claim 2 wherein:
   one of the openings of a bumper guard receives an ax handle; and,
   the other of said bumper guard receives an ax blade in a bracket having an elliptical opening therein for receiving the blade.
4. The bumper guard as claimed in claim 2 further comprising:
   a bracket on one of said bumper guards for receiving the handle of a shovel; and,
   a slanted slot on the other bumper guard for receiving the handle of said shovel at an intermediate point along the length thereof.
5. The tool rack as claimed in claim 2 further comprising:
   a slot within each of said bumper guards into which the shaft of a jack can be received and wherein said slots are provided with an opening in decreasing size to allow the shaft of a jack to be held securely therein.
6. The bumper guard as claimed in claim 1, wherein said flexible connector comprises a chain.

* * * * *